UNITED STATES PATENT OFFICE.

CHARLES B. AYERS, OF PHILADELPHIA, PENNSYLVANIA.

ASBESTOS-CONTAINING COMPOSITION FOR MAKING SHINGLES.

1,130,240.  Specification of Letters Patent.  Patented Mar. 2, 1915.

No Drawing.  Application filed July 21, 1913. Serial No. 780,231.

*To all whom it may concern:*

Be it known that I, CHARLES B. AYERS, a subject of the King of Great Britain, and a resident of Philadelphia, Pennsylvania, have invented certain new and useful Improvements in Asbestos-Containing Compositions for Making Shingles, of which the following is a specification.

The purpose of my invention is to produce an artificial stone plate capable of use in sheet or shingle form for roofing or in other forms or for such other uses, as may be desired.

A further purpose of my invention is to combine magnesite or magnesia with a chlorid, preferably chlorid of aluminum, using silex where additional density and polish are required and soapstone where desired to assist in the hardening to make it capable of a still better polish, to make the product more highly water resistant and to add to the stone-like appearance.

A further purpose of my invention is to use asbestos fiber in an artificial stone composed of magnesite or magnesia and a chlorid, preferably chlorid of aluminum and, where needed, to use wood pulp for the purpose of making the compound lighter.

Further purposes of my invention will appear in the specification and claims hereof.

I have preferred to explain my invention by reference to combinations and proportions of ingredients which I have found to be practical, durable, inexpensive and highly satisfactory for the purposes intended, while at the same time recognizing that the proportions as well as the ingredients may be varied without departing from the spirit and scope of my invention.

The bulk of my composition is intended to be magnesite. Where magnesia is more accessible or available than magnesite, it may be used, preferably in slightly smaller quantity, approximating one fourth less quantity of magnesia. Increasing the quantity of magnesite or magnesia tends to soften the composition and vice versa. In the best proportion which is known to me, I prefer to use about 16 ounces of magnesite to about two ounces of a binder, preferably of asbestos fiber, and six ounces of soapstone. I mix these dry and then add enough of chlorid of aluminum to make the mixture soft so that it can be worked. This mixture in itself hardens into a very satisfactory artificial stone. The proportion of asbestos fiber and soapstone may also be varied. Additional asbestos increases the binding effect at some loss of the stone-like properties and at additional cost. The proportion of asbestos fiber may also be reduced where the intended use or variation of the other ingredients requires less binder. The soapstone causes the product to resist solution in water and absorption of water and closes the surface against water passage. A little experimentation will readily determine the best proportions of each of the materials entering into my composition for any intended use in view of the disclosures of my invention herein. Where silex is omitted, the composition is a little more porous than with it present and for that reason is not quite so well suited for roofing nearly flat surfaces. In a considerably permissible range, the quantity of silex which I have found most desirable with the proportion of parts above given is three ounces. I have also added wood pulp to advantage, getting the best results with about three ounces of wood pulp.

With the complete list of ingredients named in the proportions given, I have found that six or eight ounces of chlorid of aluminum (of a strength represented by 36° on the Baumé hydrometer scale) is ordinarily sufficient to soften the mass so it can be worked properly and to coöperate with the magnesite, silex and soapstone in the hardening.

The mixture is most desirably compressed to shape and may even be hardened while under pressure, though preferably freed from the pressure but in the mold during drying and hardening.

The artificial stone may be used in tile form or in bulk where desired, though having special advantage in relatively thin sheet form, because of the hardness, toughness, density, and resistance to liquids possessed by it. It will further be evident that the extent as well as the necessity for use of the binder—the asbestos fiber—depends upon the use to which the material is to be put and that for some purposes it might be omitted altogether.

Having thus described my invention, what I claim as new and desire to secure by Letters Patent is:

1. An artificial stone adapted for use in sheet form comprising a product of magnesite, chlorid of aluminum, asbestos and soapstone in substantially the proportions described.

2. An artificial stone adapted for use in sheet form, comprising a product of magnesite, asbestos fiber, soapstone and chlorid of aluminum, in such proportions as to produce a substantially waterproof material.

3. An artificial stone adapted for use in sheet form, comprising a product of magnesite, asbestos fiber, soapstone, silex and chlorid of aluminum, in such proportions as to produce a substantially waterproof material.

4. An artificial stone adapted for use in sheet form, comprising a product of magesite, asbestos fiber, soapstone, silex, wood pulp and chlorid of aluminum.

CHARLES B. AYERS.

Witnesses:
  HELEN I. KAUFFMAN,
  WM. STEELL JACKSON.